May 26, 1970   G. L. SELLARS   3,514,045
APPARATUS FOR CONVERTING PEA GRAVEL INTO USEFUL AGGREGATE
Filed Sept. 11, 1967   4 Sheets-Sheet 1

INVENTOR
George L. Sellars
BY
Wood, Herron & Evans
ATTORNEYS

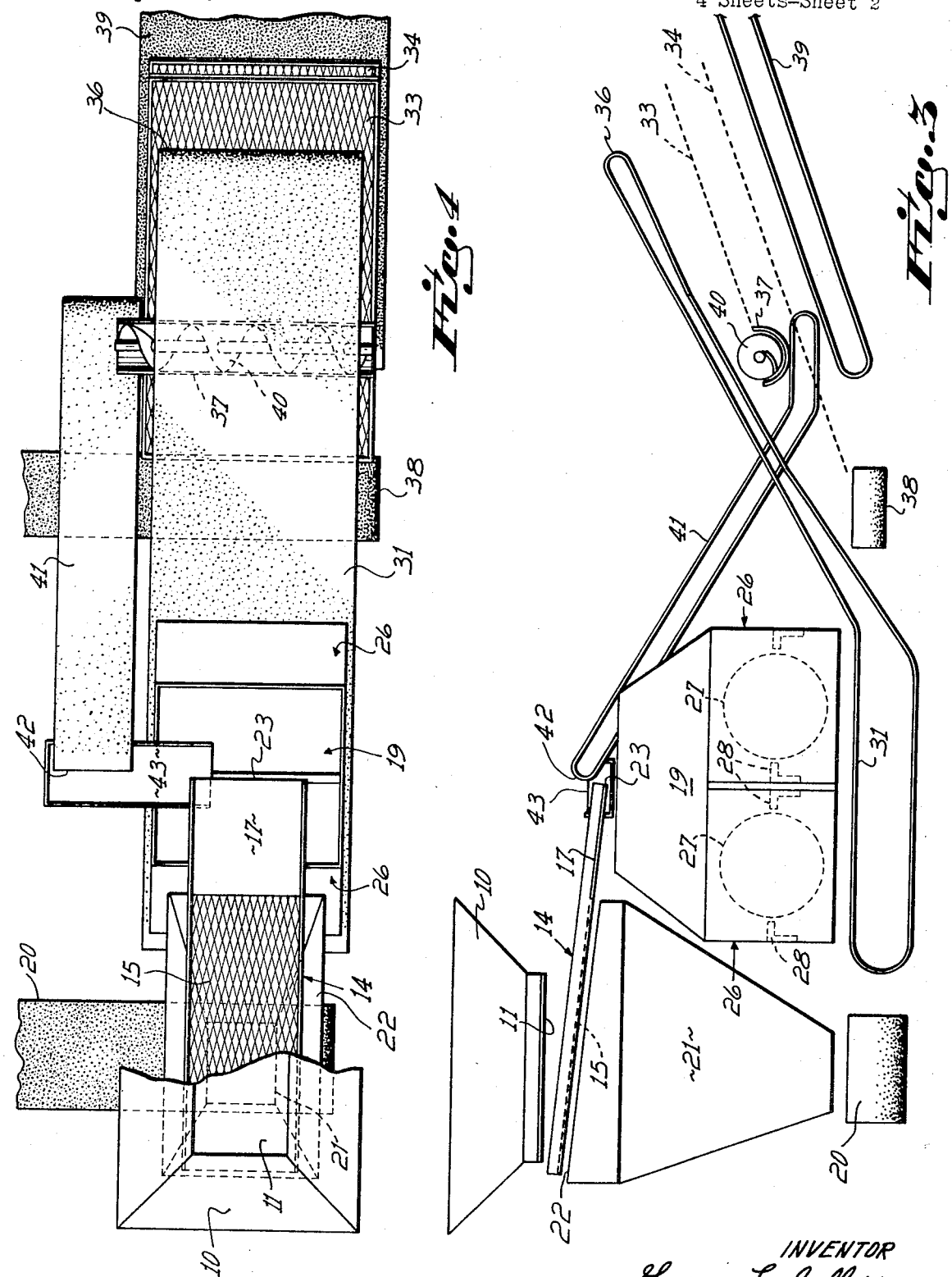

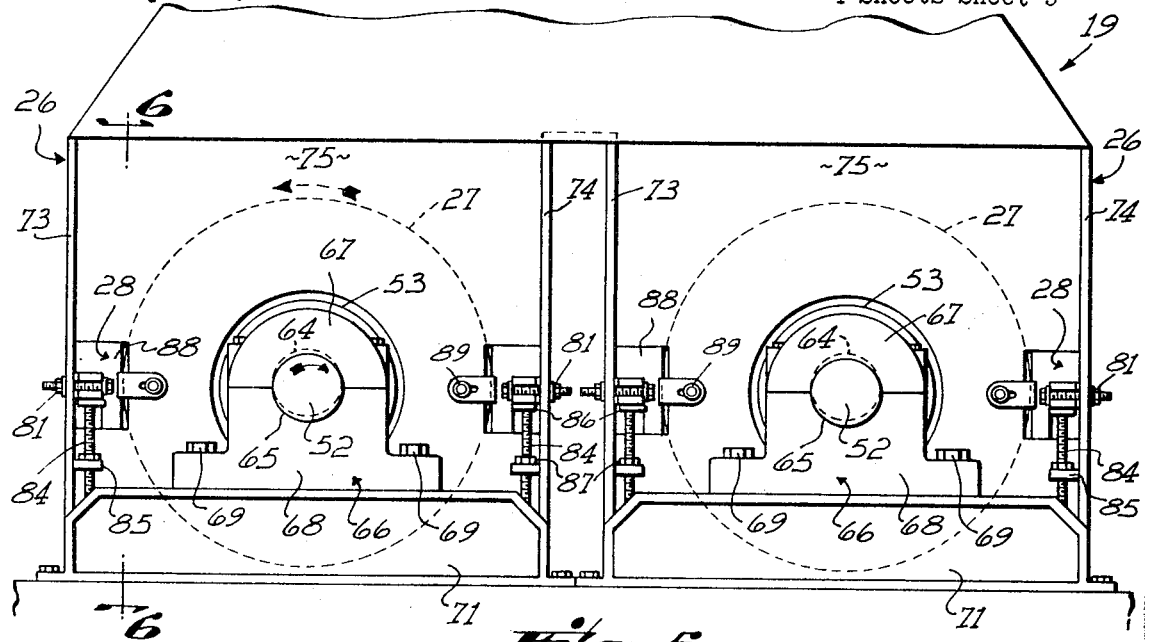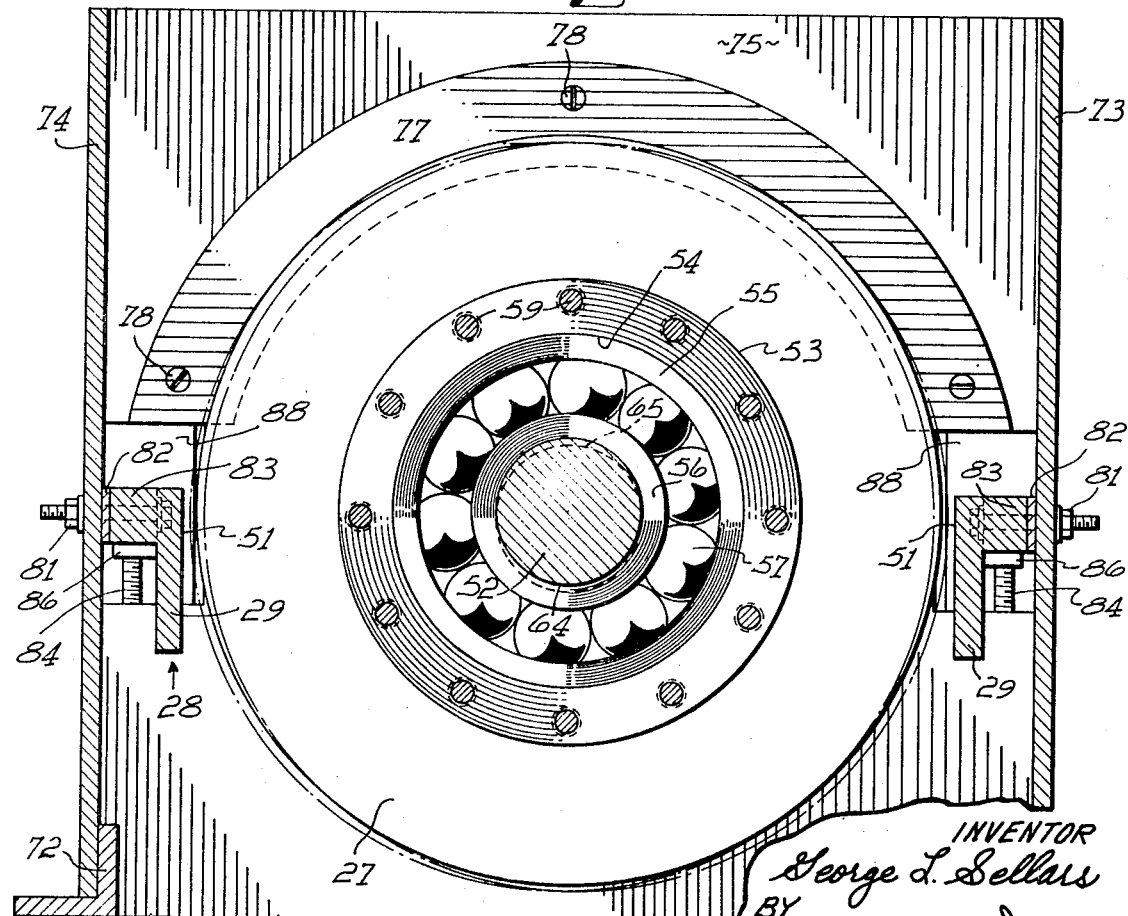

May 26, 1970          G. L. SELLARS          3,514,045
APPARATUS FOR CONVERTING PEA GRAVEL INTO USEFUL AGGREGATE
Filed Sept. 11, 1967          4 Sheets-Sheet 4
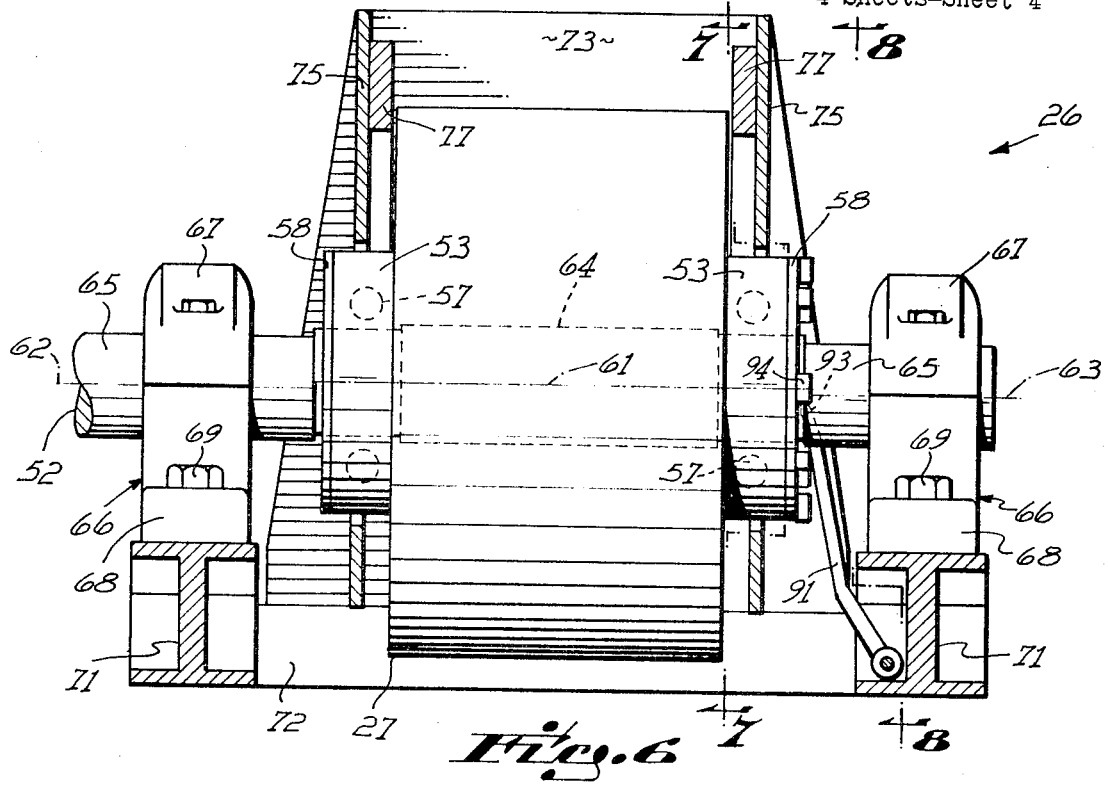
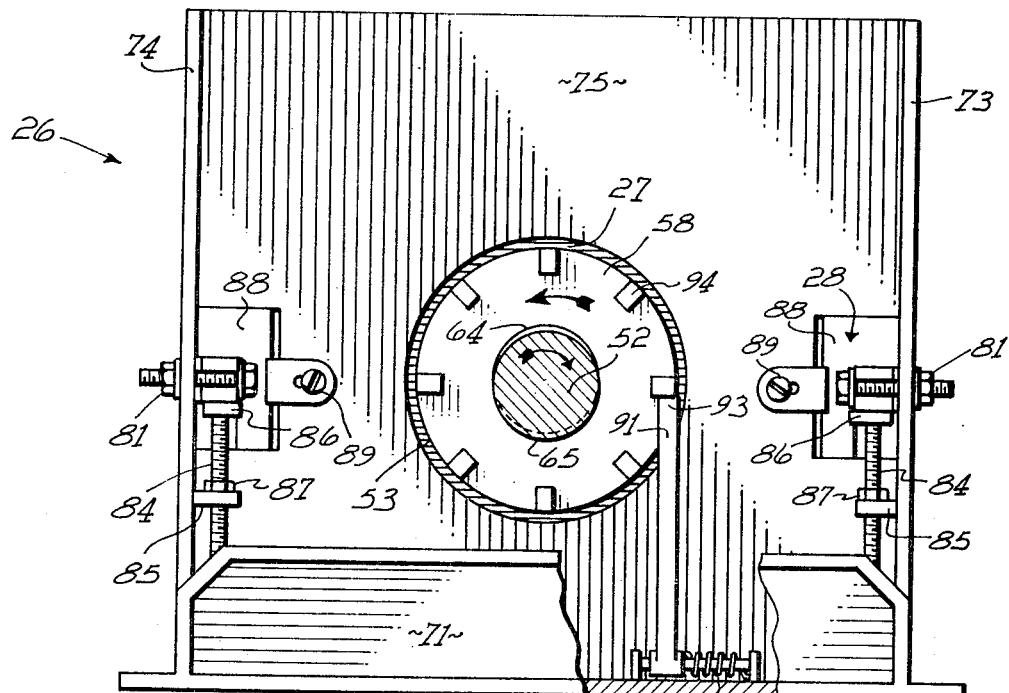
INVENTOR
George L. Sellars
BY
Wood, Herron & Evans
ATTORNEYS United States Patent Office 3,514,045
Patented May 26, 1970

3,514,045
APPARATUS FOR CONVERTING PEA GRAVEL
INTO USEFUL AGGREGATE
George L. Sellars, Terrace Park, Ohio, assignor to Dravo Corporation, Pittsburgh, Pa., a corporation of Pennsylvania
Filed Sept. 11, 1967, Ser. No. 666,733
Int. Cl. B02c 17/08
U.S. Cl. 241—208            7 Claims

ABSTRACT OF THE DISCLOSURE

Apparatus for cracking pea gravel into useful aggregate comprising (a) a pair of planar jaws, (b) an eccentrically rotatable shaft between the jaws, (c) a drum carried by the shaft, the drum being freely rotatable about the shaft, and (d) a braking device for restraining rotational movement of the drum in the same direction as the eccentric shaft rotates.

---

This invention relates to a method for converting pea gravel into a useful aggregate product and, in addition, relates to apparatus for cracking gravels of the pea gravel type.

One of the primary uses of aggregate materials is in the building of modern roads and highways. A coarse aggregate subbase of some depth generally forms the bottom layer of a roadway cross section; a less coarse gravel aggregate base then being placed on top of the subbase. Subsequently, the gravel base combination is provided with one or more layers of cement and/or bituminous surface materials. The coarse aggregate may include coarse gravel or crushed stone and the finer aggregate may include the crushed stone screenings. A layer of granular materials such as sand or sandy gravel is often used as a protective layer immediately underneath the concrete and/or bituminous surface materials to prevent frost heave and to increase the effective supporting power of the underlying aggregate mixes.

Bituminous surface materials, that is, flexible paving mixtures, have become more and more important during the last few years for purposes of repaving streets already in existence, as well as in the building of new streets and highways. Flexible paving mixtures are composed of aggregate such as, for example, sand, gravel, or crushed stone, and bituminous materials. The bituminous materials consist of asphalt products which are obtained from natural asphalt or are produced from petroleum; and tar products which are secured in the manufacture of gas or coke from bituminous coal or in the manufacture of carbureted water gas from petroleum distillates. Structural strength of the bituminous pavement mixtures, however, is almost wholly dependent upon the aggregate. The aggregate constitutes a high percentage of the mixture's volume and forms the compacted structure that carries wheel load stresses to the base layers of the roadway. The bituminous material cements the aggregate particles into a compact mass with enough plasticity to absorb shock and jars; it also fills the voids in the aggregate, thereby waterproofing the pavement.

The aggregate material used in the manufacture of flexible paving or bituminous surface mixtures must have sharp angulated surfaces that can coact with one another and become compacted so there is very little movement of the aggregate particles relative one to the other in the flexible paving layer after it has been applied to the road surface. That is, the aggregate used must be capable of providing a solid, tight layer and the aggregate particles must fit snugly together so that there is little tendency of the aggregate particles to slip relative one to the other when subjected to load conditions such as occur when heavy vehicles traverse the roadway. Thus, one of the primary problems in the manufacture of bituminous paving mixtures is to provide aggregate material that can be satisfactorily compacted to prevent slippage of the material when placed on the roadway surface. Such slippage is demonstrated in lower grade bituminous paving surfaces by ridges that are forced in the road when heavy tractor trailers and the like pass over the paving surface on hot summer days.

Gravel that is used in the construction of roadways and the like is generally mined or taken out directly from gravel pits. Gravel is generally defined as a loose or unconsolidated deposit of rounded pebbles, cobbles, or boulders whose size is greater than two millimeters in diameter. Gravels may consist only of pebbles, cobbles, and boulders, with large voids between the particles, and these gravels are known as open work gravels. Commonly, however, gravels have sand and like materials filling the interstices between the pebbles. The sand component of gravel is commonly known as the matrix and may make up to about thirty percent or more of the total constituency of the gravel taken from a gravel pit.

The gravel that is taken from gravel pits is then screened so as to eliminate smaller sizes of gravel that have been found not useful in the laying of highway surfaces. Pea gravel is among those materials that are screened out. By pea gravel, for the purposes of this application, we mean a gravel that is less than about three-eighths of an inch in diameter. Pea gravel has been so named because it is about the size of peas and closely resembles peas in appearance. Pea gravel is generally characterized by rounded surfaces with substantially no jutting angular or flat surfaces. Pea gravel is substantially a waste or nuisance product around gravel pits. It has found very little use and is not useful at all in the formation of flexible paving surfaces. This is primarily because pea gravel has no rough edges and is almost spherical in geometry. Thus, pea gravel cannot snugly fit together or be compacted into a tight mass to provide a snug, compact bituminous road surface.

This invention is based on the concept of a method for converting pea gravel into useful aggregate comprising the steps of (1) screening the pea gravel through an inlet sizing screen, (2) cracking the pea gravel retained by the sizing screen into aggregate form, (3) thereafter screening the cracked pea gravel through a top size screen, (4) screening the remaining cracked pea gravel through a bottom size sizing screen.

Also, this invention is based on the concept of apparatus for cracking pea gravel into useful aggregate comprising (a) a pair of planar jaws, (b) an eccentrically rotatable shaft between the jaws, (c) a drum carried by the shaft, the drum being freely rotatable about the shaft, and (d) a braking device for restraining rotational movement of the drum in the same dierction as the eccentric shaft rotates.

Therefore, it has been a primary objective of this invention to provide a method and apparatus for converting pea gravel into a useful aggregate product that can find application in the manufacture of flexible paving mixtures composed of aggregate and bituminous materials.

It has been another objective of this invention to provide apparatus for efficiently and economically cracking pea gravel into useful aggregate.

Other objectives and advantages of the invention will be more clear from the following detailed description taken in conjunction with the drawings in which:

FIG. 3 is a side diagrammatic view illustrating apparatus for carrying out the method of this invention;

FIG. 4 is a top view of the apparatus illustrated in FIG. 3;

FIG. 5 is a side view of two pea gravel crackers fabricated in accordance with this invention;

FIG. 6 is a cross-sectional view taken along line 6—6 of FIG. 5;

FIG. 7 is a cross-sectional view taken along line 7—7 of FIG. 6; and

FIG. 8 is a cross-sectional view taken along line 8—8 of FIG. 6.

Figure 1:
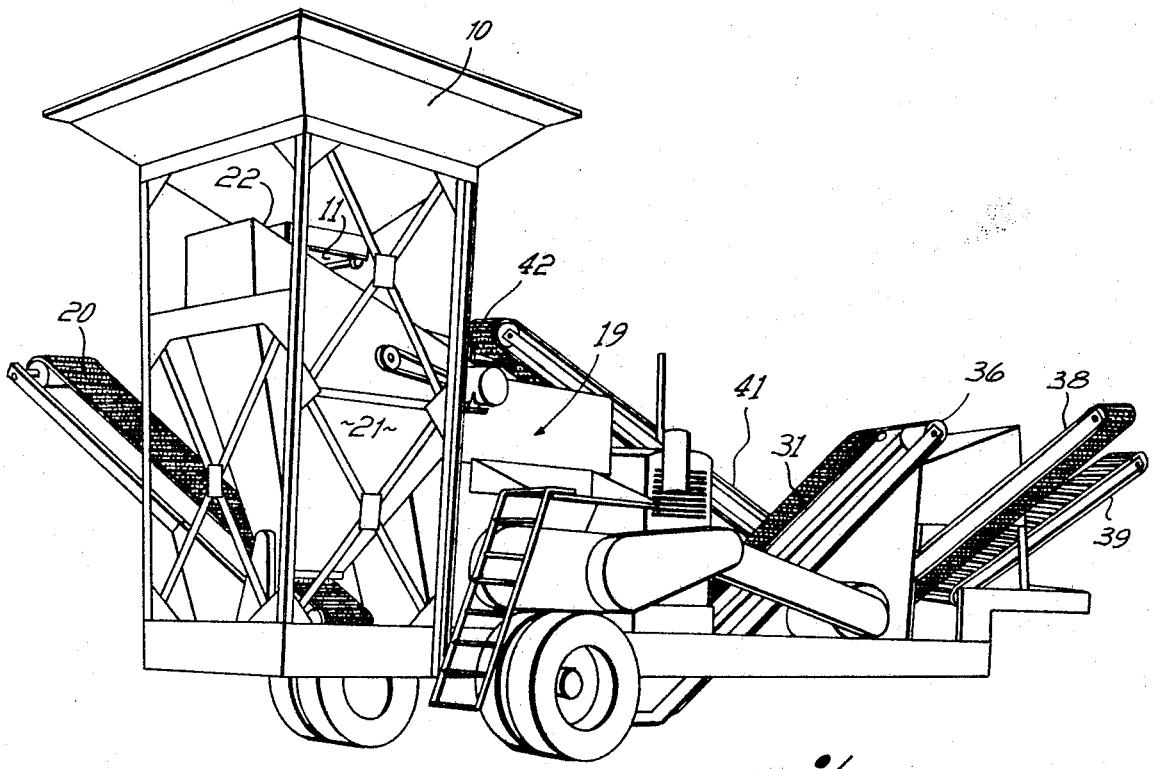
FIG. 1 is a perspective view of the complete apparatus, in practical form, for carrying out the method of this invention.
Figure 2:
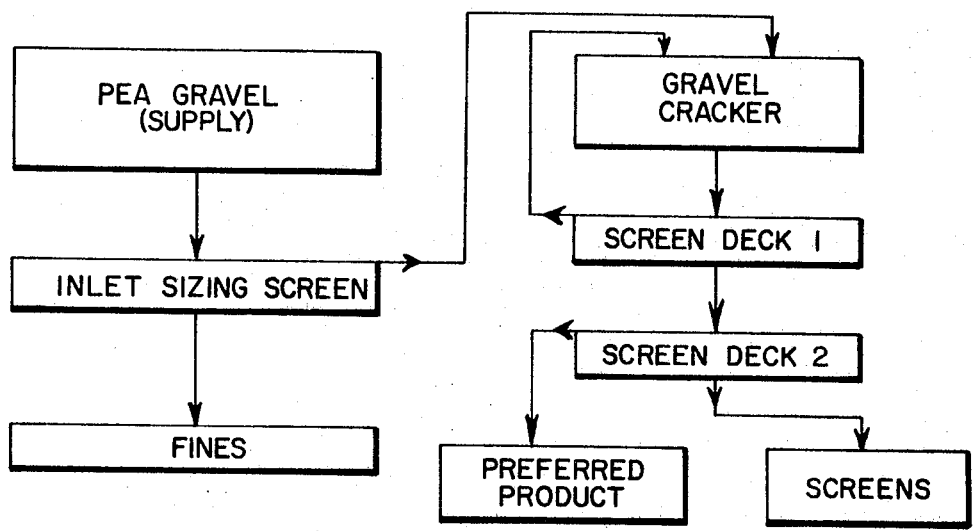
FIG. 2 is a flow diagram illustrating the method steps of this invention.

Referring to the method step flow diagram illustrated in FIG. 2, the pea gravel supply source is generally obtained from the screenings of gravel as it is obtained from the gravel pit. This initial screening of mined gravel is for the purpose of separating the larger aggregate material that is useful in laying the base or supporting layers of roadways from the small aggregate material (that includes pea gravel) which is not useful in such supporting layers. The pea gravel supply is deposited on an inlet sizing screen to remove from the pea gravel from matrix type materials, for example, sand, grit, and the like, that is often found with gravel deposits. This matrix material, often called fines, is good, for example, for wintertime use on icy roads. The fines can be mixed with salt, if desired, to provide not only a gritty surface for icy roads, but to aid in melting the ice. Also, the fines have been found useful as a fill material around sewage pipe installations to fill up the ditch in which the sewage pipe rests, as well as for forming a protective layer to prevent frost heave of concrete base slabs on which homes are built.

The pea gravel that has been separated by the inlet sizing screen from the fines is conveyed to the cracker apparatus where it is cracked into aggregate form. After the pea gravel has been cracked, it is deposited on a first screen deck or top sizing screen that is sized to restrain any gravel that may be oversized or that may have slipped through the cracker without being cracked, and this material is recycled to the cracker apparatus for another pass.

The material that passes through the first screen deck, or top sizing screen, is deposited on a second screen deck, or bottom sizing screen, where it is screened into the preferred aggregate product and the screens or residual material. The preferred aggregate product, that is, that product remaining on top of the second screen deck, is the product that is especially useful for mixing with bituminous materials in fabricating flexible or asphalt paving surfaces. Such bituminous or asphalt mixtures are used for surfacing highways to give a top-grade finish and provide a tight seal. The preferred aggregate provides small, angularly surfaced particles so that the particles can overlap and become compacted one with the other to provide a good, tightly sealed surface. The cracked pea gravel material permits less asphalt to be used in the initial manufacture of the paving mixtures. With this type of asphalt mixture, even on hot summer days the asphalt will not be displaced by heavy vehicles.

The screens or material that has passed through the second screen deck is also useful in the building of highways as a filler or binder between the large, crushed aggregate or rock which constitutes the bottom or subbase layer of the roadway. The screens are spread on top of the crushed rock layer and washed through the interstices thereof by means of water to provide the filler or binder function.

Apparatus for carrying out the method of the invention is illustrated in FIGS. 3 and 4. The apparatus includes a pea gravel supply hopper 10 preferably provided with bottom doors 11. An inlet sizing screen 14 is slopingly disposed beneath the gravel supply hopper 10 to size the pea gravel for the cracking step. The inlet supply screen 14, in its screening area 15, is preferably provided with rectangular mesh screening, as opposed to square mesh screening. Rectangular mesh screening is preferred because it permits flat gravel material such as, for example, disc-shaped pieces, to pass through the inlet sizing screen 14 and it permits spherical and cubical gravel material to be retained on the sizing screen. It is preferred at this point in the process to separate the substantially flat gravel material, as well as matrix material, from the pea gravel supply because in the cracking step the flat material will most probably slip through unaffected by the cracking apparatus. The size of the rectangular mesh screen opening is preferred to be about ⅛ inch wide by about ½ inch long so as to retain the ¼ inch to ⅜ inch size pea gravel on the inlet sizing screen 14. Downstream from the screening area 15 in the inlet sizing screen 14 is a trough 17 for conveying the gravel retained on the screen area into cracking apparatus 19. The inlet sizing screen 14, including the screening area 15 and trough 17 at its lower end, is preferably continuously vibrated by means of equipment, not shown in detail, for achieving movement of the gravel over the screening area and trough to the cracking apparatus 19.

Beneath the screening area 15 of the inlet sizing screen 14 is positioned a fines chute 21 having top opening 22 dimensions substantially the same as the dimensions of the screening area itself. The fines chute 21 receives the fines that pass through the inlet sizing screen 14 and directs the fines onto a bypass conveyor belt 20. The bypass conveyor belt 20 conveys the fines to suitable storage facilities.

The pea gravel retained on the inlet sizing screen 14 falls off the end 23 of the trough 17 into the cracking apparatus 19. The cracking apparatus 19, which will be subsequently described in greater detail, includes two crackers 26 each of which comprise a vibrating drum 27 and a pair of jaws 28. The gravel is cracked between the vibrating drum 27 and the jaws 28. Preferably the jaws 28 are set about ³⁄₁₆ inch from the drum 27 so as to provide a 100% cracked product. As a general rule, for a 100% cracked product the gate size, that is, the distance between the jaws 28 and the drum 27, must be less than the bottom size of the gravel retained by the inlet sizing screen 14. However, for some purposes a 40% to 60% or other cracked aggregate product will suffice, that is, the pea gravel end product need consist of only 40% or 60% cracked gravel or aggregate. In such circumstances, the gate size need merely be opened to permit the desired percentage of pea gravel to pass therethrough without being cracked. Such a procedure materially increases the output of the method and apparatus.

After being cracked, the aggregate falls through the cracking apparatus 19 onto an aggregate conveyor 31 positioned beneath the cracking apparatus. The aggregate conveyor 31 transports the cracked pea gravel out from underneath the cracking apparatus 19 to a pair of superimposed, angularly disposed sizing screens, that is, a deck one sizing screen 33 and a deck two sizing screen 34. The cracked gravel falls from the terminus 36 of the aggregate conveyor 31 onto the deck one sizing screen 33. The deck one sizing screen 33 is provided with a mesh preferably having about a ¼ inch square opening so that the deck one screen retains the top size of the cracked gravel product.

The remaining cracked gravel product passes through the deck one screen 33 onto the deck two screen 34. The deck two screen 34 is preferably sized with a ⅛ inch square opening so that the screen retains the bottom size of cracked material, this bottom size being the preferred product that is very useful in the manufacture of bituminous paving surfaces. Both the deck one 33 and deck two 34 screens are provided with vibratory apparatus, not shown, to move the retained material toward the lower end of each screen. The preferred product that is retained on the deck two screen 34 is vibrated from the screen onto a preferred product conveyor 38 by means of which it is transported to a suitable product storage site. The screens, that is, the material that passes through the deck two screen 34, falls onto a screens conveyor 39 which transports this material to yet a third or screens storage site.

The gravel that has been retained on the deck one sizing screen 33 is vibrated downwardly into a trough 37 carrying a screw conveyor 40. The screw conveyor 40 pushes the gravel onto a recycle conveyor 41 which transports the material to the terminus 42 of the recycle conveyor where it falls into a recycle trough 43 and is thereby directed into the cracking apparatus 19 for another pass.

In operation, pea gravel to be crushed is placed in the hopper 10. The doors 11 at the bottom of the hopper 10 are opened and closed during the operation of the machine at an established frequency to insure an even flow of gravel through the machine. The gravel is initially run over the inlet sizing screen 14 built with rectangular mesh so that flat components and fines of the pea gravel fall through the screen for discharge by means of the bypass conveyor belt 20 as a first usable product. Leaving the inlet sizing screen 14, the pea gravel falls by gravity into the cracking apparatus 19. The cracking apparatus 19 cracks the pea gravel, which aggregate then falls onto a moving aggregate conveyor 31 for transportation to two superposed vibratory separating screens 33, 34. The upper or deck one screen 33 has a larger mesh than the lower or deck two screen 34. That part of the gravel that does not pass through the upper one of the two vibrating screens is recycled to the cracking apparatus 19 by a recycle conveyor 41. That part of the gravel that passes the upper screen 33, but is retained by the lower screen 34, runs onto a preferred product conveyer 38 and it is discharged as the preferred usable aggregate product. That portion of aggregate that passes the second screen 34 is discharged by a screens conveyer 39 to form a third usable material. Thus, the end products of the operation are three different sizes of usable aggregate, these usable products being made from what, for all practical purposes, is a nuisance by-product around a gravel plant, namely, pea gravel.

The cracking apparatus 19 of this invention for converting pea gravel into useful aggregate is specifically illustrated in FIGS. 5 through 8. In the preferred embodiment, the cracking apparatus 19 generally consists of two crackers 26 disposed side by side, see FIG. 5, for increasing the gravel throughput that can be processed by the method described above.

The major components of each cracker are the drum 27 and the jaws or anvils 28 disposed at either side of the drum, each jaw having a cracking surface or area 51. The drum 27 is mounted to drive shaft 52 through hubs 53 at either side of the drum. Each hub 53 is suitably joined with the sides of the drum 27. The inner surface 54 of each hub 53 is provided with an outer ball bearing race 55, an inner ball bearing race 56 being carried by the drive shaft 52. Disposed between the inner 56 and outer 55 ball bearing races are a plurality of ball bearings 57, thereby mounting the drum 27 to the drive shaft 52 in a manner that permits the drum to freely rotate relative to the rotational direction of the drive shaft. The ball bearing races 55, 56 and ball bearings 57 themselves are maintained in operating relationship with each hub 53 by a hub plate 58 secured to the hub by suitable stud bolts 59.

It will be noted, from FIG. 6, that the drive shaft 52 has two center lines, thereby providing an eccentric-type drive shaft. The first or drum center line 61 is provided for the drum mounting area 64 of the drive shaft 52, that is, that area disposed between the hub plates 58 of the drum's hubs 53. That portion of the drive shaft 52 extending out from each of the drum hubs 53, that is, the bearing area 65 of the drive shaft, is provided with a second or drive center line 62, 63 that is not coaxial with the drum center line 61. The drive center lines 62, 63 are coaxial. Thus, as the drive shaft 52 is rotated by means of a work input to one of the drive shaft's bearing areas 65 the drum mounting area 64 of the drive shaft is eccentrically rotated.

Bearing areas 65 of the drive shaft 52 are carried in suitable bearing blocks 66 having a top half 67 and a bottom half 68 to permit ready dissembly of the apparatus for maintenance or other purposes. The bottom half 68 of each bearing block 66 is mounted, by means of hexbolts 69, to an I-beam 71. The I-beams 71 are positioned transverse to the axis of the drum to form two sides of a base or structure supporting frame, the other two frame sides being angle pieces 72 that are mounted to and disposed between the I-beams. Extending upwardly from the angle pieces 72 are a front wall 73 and back wall 74, and extending upwardly from and disposed inwardly of the I-beams are two oppositely positioned side walls 75. The chamber formed by the side walls 75 and the front 73 and back 74 walls, in combination with the outer periphery of the drum 27, serves as a hopper for the pea gravel as it awaits cracking between the drum's periphery and the jaws 28.

As illustrated in FIGS. 6 and 7, a wear pad 77 is mounted to each side wall 75 for the purpose of reinforcing the side walls at this point as well as to insure that pea gravel deposited into the cracker from above remains in contact with the periphery of the drum and does not fall between the drum's sides and the side walls 75 so as to foul the cracker. Each wear pad 77 is substantially semicircular and extends from above to below the periphery of the drum radially speaking. The wear pads 77 are mounted to the side walls 75 by suitable fasteners 78 so as to permit easy changing and maintenance of the pads as required.

Each cracking jaw 28 includes an L-shaped anvil block 29 that can be fixedly mounted to the front 73 and rear 74 walls of each cracker by a locking bolt and nut arrangement 81, see FIG. 7. Each jaw is made adjustable in the drum's radial direction by providing shims 82 between the butt 83 of the anvil 29 and the respective end wall 73, 74. As many or as few shims 82 may be inserted in such position as desired to give the preferred clearance between the cracking or working surface 51 of the anvil 29 and the peripheral surface of the drum 27. Such an adjustment permits pea gravel products to be cracked with varying cracked product percentages. For example, if a 100% pea gravel cracked product is desired, the clearance between the cracking surface of the jaw and the peripheral surface of the drum will be less than the diameter of the smallest pea gravel material being processed. On the other hand, if a less than 100% cracked product is acceptable, a certain number of shims are removed to widen the gap between the working area 51 and the drum's periphery until the gap is larger than the smallest pea gravel material. By regulating the gap clearance a desired percentage of the pea gravel comprising the smaller fractions of the original supply passes through the gap without being cracked.

The cracking surface 51 of each jaw 28 is also adjustable in the vertical direction, see FIG. 8. A vertical adjustment bolt 84 is provided to cooperate with a tongue 85 extending out from each end wall 73, 74. The vertical adjustment bolt 84 carries a support block 86 at its upper end and is provided with a lock nut 87 intermediate the support block and tongue 85. To adjust each jaw 28 upwardly, the vertical adjustment bolts 84 need merely be moved upwardly after the anvil blocking bolts 81 have been relieved. The anvil locking bolts 81 extend through each end wall 73, 74 in a vertical slot or channel so as to permit this vertical adjustment of the jaws 28 when desired. Such vertical adjustment is important so that the working area 51 of each jaw 28 may be varied as wear is encountered during the useful life of the device.

Removable guide ears 88 are mounted to the side walls 75 by means of adjusting nuts 89 in the cracking or jaw area so as to permit ready access to that area in case of maintenance difficulties or plugging up of the cracker.

The drum 27 is also provided with a braking device to prevent rotation of the drum in the same direction as the shaft 52 rotates, see FIGS. 6 and 8. The braking device includes a pawl 91 pivotally mounted to one I-beam 71 of the support frame. The pawl 91 is continuously biased inwardly by means of a spring 92 so that the working end 93 of the pawl is always spring biased against its respective hub plate 58. The hub plate 58 is provided with spaced dogs or ratchet teeth 94. Thus, as illustrated in FIG. 8, the drum 27 is prevented from rotating in a clockwise direction because the end 93 of the pawl 91 engages a ratchet tooth 94 on the hub plate 58, however, the drum 27 can rotate in a counterclockwise direction because the ratchet teeth 94 approach the pawl 91 from the underneath side, see FIG. 6, and thereby bias the working end 93 upwardly and out of engagement with the teeth.

In operation of the cracker, gravel is placed on top of the drums 27, see FIG. 5, from where it passes through the gap between the drum 27 periphery and the jaws 28 where it is cracked. The cracked aggregate and fines then fall by gravity out from underneath the cracking apparatus 19. With no load in the form of pea gravel to be cracked within the cracker, the drum 27 will pick up rotational speed in a clockwise direction when the drive shaft 52 is rotated in a clockwise direction. Upon becoming loaded with pea gravel, grooves would soon be worn into the peripheral surface of the drum 27. To prevent this clockwise rotation a brake, in the form of the pawl 91 and ratchet teeth 94, is applied to the drum. Under loaded conditions, this brake remains in place but, unexpectedly, it becomes ineffective and the drum 27 does in fact rotate slowly. However, the drum 27 does not rotate in a clockwise direction because the pawl 91 and ratchet teeth 94 prevent such clockwise movement but, peculiarly, the drum rotates in a counterclockwise direction. Thus, the drum 27 under operating and loaded conditions rotates very slowly in a direction opposite to that of the rotating drive shaft 52. In these circumstances, as is explained, the pawl 91 simply skips over the ratchet teeth 94 of the braking device.

The cracking jaws 28 at the sides of the drum 27 are vertically planar, that is, the working area 51 is straight up and down. It is believed that the reason for the unexpected rotation of the drum 27 in a direction opposite that of the eccentric shaft's rotation is that most of the cracking loads placed upon the drum are above a horizontal plane that includes the drum's central axis. It is to be noted that the inching movement obtained during operation is highly advantageous because it spreads wear evenly over the entire surface of the drum 27.

Although the invention has been described in considerable detail with particular reference to certain preferred embodiments thereof, variations and modifications can be effected within the spirit and scope of the invention as described hereinbefore and as defined in the appended claims.

What I desire to claim and protect by Letters Patent is:

1. Apparatus for cracking gravel into useful aggregate comprising
   an eccentrically rotatable shaft,
   a drum carried by said shaft, said drum being substantially freely rotatable about said shaft,
   a pair of substantially planar jaws operatively associated with said drum, the substantially planar surface of each jaw being substantially parallel to a tangential plane of said drum's surface, and
   braking means for restraining rotational movement of said drum in the same direction as said shaft rotates.

2. Apparatus as set forth in claim 1 wherein said braking means comprises
   ratchet teeth mounted to an end of said drum in a substantially circular configuration, and
   a spring-biased pawl mounted for cooperative engagement with said ratchet teeth.

3. Apparatus as set forth in claim 1 including adjustment means associated with said planar jaws, said adjustment means permitting clearance adjustments to be made between each of said jaws and the surface of said drum.

4. Apparatus as set forth in claim 3 wherein the planar surfaces of said jaws are substantially parallel.

5. Apparatus as set forth in claim 4 wherein the planar surfaces of said jaws are perpendicularly mounted.

6. Apparatus as set forth in claim 1 including a hopper positioned about the planar surfaces of said jaws and at least a portion of said drum, said hopper being of a width substantially the same as the axial length of said drum.

7. Apparatus as set forth in claim 6 including a wear pad mounted to each side of the hopper and positioned at each end of said drum.

References Cited

UNITED STATES PATENTS

| | | | |
|---|---|---|---|
| 1,719,549 | 7/1929 | Hume | 241—205 |
| 1,946,763 | 2/1934 | Sallwasser | 241—214 |
| 2,174,116 | 9/1939 | Bilocq | 241—204 |
| 2,464,732 | 3/1949 | Traylor | 241—208 |
| 2,582,734 | 1/1952 | Adams | 241—208 |
| 3,229,922 | 1/1966 | Weiss et al. | 241—204 |

GERALD A. DOST, Primary Examiner

U.S. Cl. X. R.

241—24, 68